United States Patent [19]

Harumatsu et al.

[11] 4,393,709
[45] Jul. 19, 1983

[54] DIRECTION DETECTION APPARATUS

[75] Inventors: Masatoshi Harumatsu, Tamayama; Makoto Tomoyori, Iwate; Noboru Tsushima, Morioka, all of Japan

[73] Assignee: Alps Electric Co., Ltd., Japan

[21] Appl. No.: 320,519

[22] Filed: Nov. 12, 1981

[30] Foreign Application Priority Data

Nov. 13, 1980 [JP] Japan .................................. 55-159896

[51] Int. Cl.³ ............................................. G01C 19/58
[52] U.S. Cl. ........................................ 73/505; 33/300; 73/509; 73/510; 364/559
[58] Field of Search ................. 73/505, 509, 510, 511, 73/517 A; 364/424, 559; 33/300

[56] References Cited

U.S. PATENT DOCUMENTS 3,015,959  1/1962  Courtney-Pratt ................. 73/517 R
3,400,284  9/1968  Elazar ................................. 73/517 R
4,306,456 12/1981  Maerfeld ............................ 73/517 R

OTHER PUBLICATIONS

IEEE Transactions on Electron Devices, vol. 26, No. 12, Dec. 1979, p. 1911, "A Batch-Fabricated Silicon Accelerometer", by Roylance et al.

Primary Examiner—James J. Gill
Attorney, Agent, or Firm—Guy W. Shoup; Eliot S. Gerber

[57] ABSTRACT

A direction detection apparatus which detects the traveling direction of a moving object on the basis of the movement of a weight. It comprises a centrifugal force detector, a clock signal generator, and a velocity detector, and also a detection device which receives signals from the detectors and the generator to provide a directional angle.

6 Claims, 14 Drawing Figures

DIRECTION DETECTION APPARATUS

BACKGROUND OF THE INVENTION

The present invention relates to an apparatus which detects the traveling direction of a moving vehicle by utilizing a centrifugal force generated when the moving object turns.

Heretofore, apparatuses for detecting the direction of a moving vehicle have relied on, for example, a method which detects the direction of the earth magnetism and a method which utilizes a gyro-compass.

Such direction detection apparatuses have involved disadvantages as stated below. In case of the former, the apparatus is prone to be influenced by the ambient magnetic field because the magnetic field of the earth magnetism is feeble. Therefore, the apparatus is limited as to its place of installation and cannot perform a precise measurement. Moreover, the apparatus requires complicated adjustments because of the magnetic deviation which differs depending on the region where it is used. In addition, it cannot be used at all in a region having an intense magnetic field. On the other hand, in case of the latter, the gyro body has a mechanism of high precision and therefore requires a high degree of skill for its adjustments. In addition, the cost becomes high, and its size may be large.

SUMMARY OF THE INVENTION

The present invention has been made in view of the drawbacks described above, and has for its object to provide a direction detection apparatus which can be installed on any place and which is usable even in a region having an intense magnetic field.

Another object of the present invention is to provide a direction detection apparatus which has a simple structure and which can therefore be adjusted with ease and fabricated in a small size and at a low cost.

In order to accomplish the objects, the direction detection apparatus of the present invention detects the direction of a moving object by the use of a centrifugal force detector, a pulse generator as a clock signal generator, and a velocity detector.

DETAILED DESCRIPTION OF THE INVENTION

Figure 1:
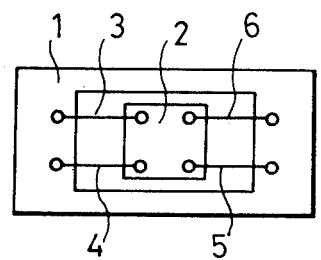
FIG. 1 is a plan view showing the structure of a centrifugal force detector according to the present invention.

FIG. 1 shows the construction of a centrifugal force detector. Numeral 1 designates a frame. Numeral 2 designates a weight, which moves rightwards or leftwards in accordance with a force applied to the centrifugal force detector. Numerals 3, 4, 5 and 6 indicate fine thread resistors which are made of a copper-nickel alloy or the like. The resistors 3, 4, 5 and 6 couple the weight 2 and the frame 1, and limit the movement of the weight 2. They are lengthened or shortened by the movement of the weight 2, and simultaneously have their resistances varied. FIG. 1 shows the state in which no force is applied to the acceleration detector. The weight 2 lies in the central part of the frame 1, and is balanced by the tensions of the resistors 3, 4, 5 and 6. At this time, all the resistances of the resistors 3, 4, 5 and 6 are equal.

Figure 2:
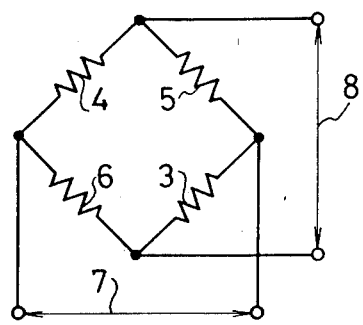
FIG. 2 is a circuit diagram showing the connection relationship of resistors shown in FIG. 1.

FIG. 2 is a circuit diagram showing the connection of the resistors 3, 4, 5 and 6 in FIG. 1. A fixed voltage is applied across input terminals 7. In the state in which no force acts on the centrifugal force detector, the null voltae appears across output terminals 8 because all the resistances of the resistors 3 to 6 are equal.

Figure 3:
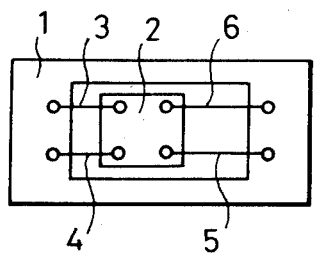
FIG. 3 is a plan view showing an operating state of the centrifugal force detector shown in FIG. 1.

FIG. 3 is an explanatory view illustrative of an operation in the state in which a rightward acceleration acts on the centrifugal force detector. The weight 2 moves leftwards according to the law of inertia, and is balanced with the resistors 5 and 6 expanded and the resistors 3 and 4 contracted. Each of the resistances of the resistors 5 and 6 increases into R+r owing to the expansion, whereas each of the resistances of the resistors 3 and 4 decreases into R−r owing to the contraction.

The variation r of the resistance is proportional to the change of the length of each resistor 3, 4, 5 or 6. In the illustrated state, a voltage V is generated across the output terminals 8. Letting E denote the voltage applied across the input terminals 7, $$V = (r/R)E \tag{1}$$

holds. Since the resistance value R and the applied voltage value E are constant, the voltage proportional to the variation r of the resistance value is obtained. The variation r of the resistance value is proportional to the change of the length of the resistor 3, 4, 5 or 6, and this change is, in turn, proportional to the force applied to the weight 2. Therefore, the force applied to the centrifugal force detector or the centrifugal force can be detected by measuring the voltage delivered across the output terminals 8.

Figure 4:
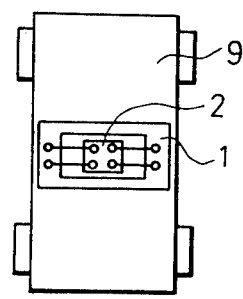
FIG. 4 is a plan view showing the installation of the centrifugal force detector according to the present invention on a moving object.

FIG. 4 is a view showing the state in which the centrifugal force detector is mounted on a moving object 9. The weight 2 moves rightwards or leftwards when a lateral acceleration, i.e., a centrifugal force acts on a moving object 9. For example, the right turn of the moving object 9 causes the weight 2 to move leftwards, and the left turn of the same causes the weight 2 to move rightwards. Although not shown, a voltage proportional to the movement of the weight 2 appears across the output terminals 8, so that the centrifugal force acting on the moving object 9 can be detected.

Figure 5:
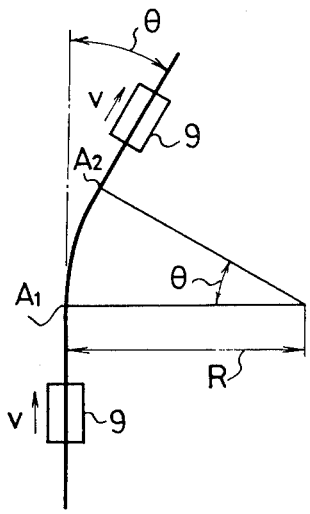
FIG. 5 is a diagram for explaining the principle of a direction detection apparatus.

FIG. 5 serves to explain the principle of the direction detection apparatus according to the present invention. It is supposed that the moving object 9 passes through a spot $A_1$ at a time $t_1$, that it turns an angle $\theta$ at a radius of curvature of R, that it passes through a spot $A_2$ at a time $t_2$ and that it thereafter continues a straight advance in a direction defining the angle $\theta$ with respect to the first direction. It is also supposed that the moving object 9 moves at a uniform velocity v in the course. Letting a denote the acceleration which the moving object 9 undergoes while moving between the spot $A_1$ and the spot $A_2$, $$a = (v^2/R) \qquad (2)$$

Letting S denote the distance between the spot $A_1$ and the spot $A_2$, $$S = R\theta = v(t_2 - t_1) \qquad (3)$$

From Equations (2) and (3), the angle $\theta$ becomes:

$$\theta = \frac{v(t_2 - t_1)}{R} = \frac{v(t_2 - t_1)}{\frac{v^2}{a}} = \frac{a(t_2 - t_1)}{v} \qquad (4)$$

As apparent from Equation (4), the angle $\theta$ or the traveling direction of the moving object is readily found by measuring the three physical quantities of the velocity v, the period of time $(t_2 - t_1)$ and the acceleration a.

Figure 6:
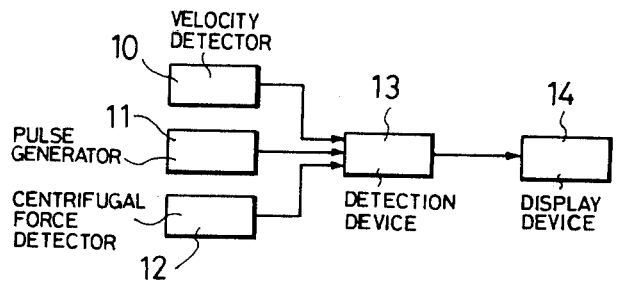
FIG. 6 is a block diagram showing an embodiment according to the present invention.
Figure 7:
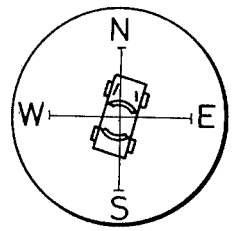
FIG. 7 is a plan view showing a part of a display device which displays a signal delivered from the embodiment of the present invention.

FIG. 6 is a block diagram showing an embodiment of the present invention. In the figure, numeral 10 designates a velocity detector for the moving object 9. It supplies the velocity signal of the moving object 9 to a detection device 13. In case of, for example, a vehicle, the velocity signal of a speedometer or the like can be utilized as the aforecited velocity signal. Numeral 11 indicates a pulse generator as a clock signal generator, which supplies a time signal to the detection device 13. A centrifugal force detector 12 as explained with reference to FIG. 1 supplies the centrifugal force signal of the moving object 9 to the detection device 13. The detection device 13 supplied with the signals delivers an angle signal. A display device 14 which displays the traveling direction of the moving object 9 displays the value of the angle in a form easy to read visually, for example, as the inclination of the picture of the moving object as shown in FIG. 7.

As stated above, the direction detection apparatus of the present invention detects the traveling direction of the basis of the signals of the centrifugal force detector, the pulse generator and the velocity detector. Therefore, the direction detection apparatus is not affected by magnetism at all. Accordingly, the installation place of the apparatus is not restricted to, for example, a magnetically neutral place but can be selected at will. The apparatus does not require any adjustment due to a magnetic deviation, and it normally operates even in a region having an intense magnetic field. In addition, since the centrifugal force detector has the simple structure constructed of only the weight and the resistors, it can be fabricated in a small size and at low cost. Further, since it merely has the weight moved a minute amount when subjected to a centrifugal force, it is readily adjusted. The apparatus of the present invention achieves beneficial effects.

While, in the embodiment, the centrifugal force detector 12 has been described as employing the resistance wires of the copper-nickel alloy or the like, pressure-sensitive resistance elements to be described below can also be utilized.

Figure 8A:
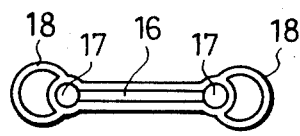
FIGS. 8(a) and 8(b) are a plan view and a sectional side view of a pressure-sensitive resistance element for use in an embodiment, respectively.
Figure 8B:
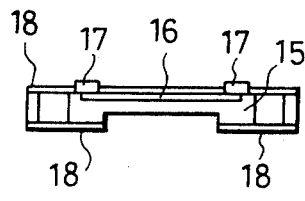

FIGS. 8(a) and 8(b) show the structure of the pressure-sensitive resistance element. Numeral 15 designates a base of silicon whose total length is approximately 1.7 mm and whose both ends are ring-shaped. One end of the silicon base 15 is attached to the frame 1 in FIG. 1, while the other end to the weight 2. A resistor 16 is formed in the central part of the base 15 by diffusion. When a force acts on the base 15 to change the length thereof, the length of the resistor 16 is similarly changed, and the resistance value thereof is simultaneously changed. Both the ends of the resistor 16 are connected to contacts 17 made of a material of high conductivity such as gold, to have their resistances reduced. Shown at numerals 18 are protective films of an oxide. When the above resistance element is used instead of each of the resistors 3, 4, 5 and 6 shown in FIG. 1, the resistor can be made still smaller in size, and hence, the centrifugal force detector is miniaturized more.

Figure 9A:
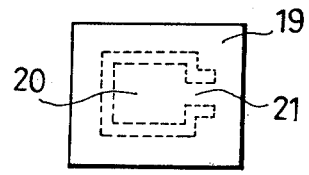
FIGS. 9(a) and 9(b) are a plan view and a sectional side view showing a centrifugal force detector employing a cantilever for use in an embodiment, respectively.
Figure 9B:
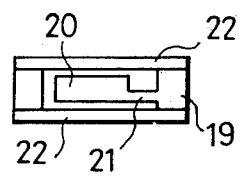

FIGS. 9(a) and 9(b) are views showing another embodiment of the centrifugal force detector 12 according to the present invention as employs a cantilever. Numeral 19 indicates a base of silicon which is formed to a thickness of approximately 200 μm. In the vacancy of the central part of the base 19, a weight 20 and the cantilever 21 are unitarily formed. Shown at numerals 22 are covers of glass, which protect the interior of the detector. The weight 20 moves freely in the space defined by the base 19 and the covers 22 within the movable range of the cantilever 21. When the weight 20 is moved by the centrifugal force generated at the turn of the moving object, the cantilever 21 is deformed, and simultaneously, charges corresponding to the deformation of the cantilever 21 are generated. The force acting on the weight 20 can be measured by detecting the charges.

With such centrifugal force detector, it becomes possible to render the size of the direction detection apparatus still smaller. When a circuit for processing electric signals in the centrifugal force detector 12 is assembled on the base 19, the apparatus can be made still smaller in size and lighter in weight. Moreover, since the IC manufacturing technology can be applied, many great effects such as mass production, low cost and simplification of the apparatus can be achieved.

Figure 10:
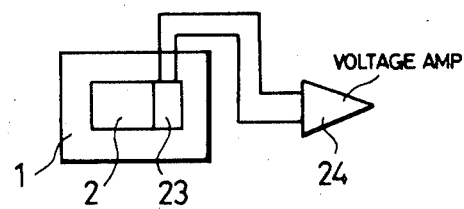
FIG. 10 is a plan view showing a centrifugal force detector employing a charge generator for use in an embodiment.

FIG. 10 is a diagram showing another embodiment of the centrifugal force detector 12 according to the present invention as employs an electrostriction transducer. Numeral 23 indicates a charge generator which is made up of the electrostriction transducer and which generates charges proportional to a pressure applied thereto. The charge generator 23 is made of an electrostrictive material having a sufficiently large capacitance, such as rock crystal, Rochelle salt and barium titanate. Numeral 24 indicates a voltage amplifier circuit which has a sufficiently high input impedance. The charge generator 23 is fitted in the interspace between the weight 2 and the frame 1 after the resistors 3, 4, 5 and 6 have been removed. The charges generated by the charge generator 23 are applied to the voltage amplifier circuit 24. The centrifugal force detector 12 is constructed of the frame 1, the weight 2, the charge generator 23 and the voltage amplifier circuit 24 described above.

When a centrifugal force acts on the centrifugal force detector 12, the weight 2 moves, a change occurs in a pressure acting on the charge generator 23, and charges develop. The charges are discharged through the voltage amplifier circuit 24. Letting V denote a voltage applied across the input terminals of the voltage amplifier circuit 24, R denote the input impedance of the voltage amplifier circuit 24 and C denote the capacitance of the charge generator 23, the voltage V at a time t after the initiation of the discharge is expressed as follows:

$$V \propto \frac{Q}{C} e^{-\frac{t}{RC}} \quad (5)$$

Since the voltage decreases rapidly with time, a sufficiently large capacitance is required for the charge generator 23 and a sufficiently high input impedance for the voltage amplifier circuit 24 in order to accurately measure the voltage V (it is required to make the time constant large).

When the centrifugal force detector 12 stated above is applied to the embodiment shown in FIG. 6, similar effects can be achieved.

Figure 11A:
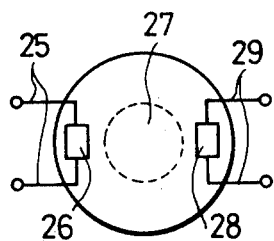
FIGS. 11(a) and 11(b) are a plan view and a sectional side view showing piezoelectric thin films and a diaphragm for use in another embodiment of the centrifugal force detector, respectively.
Figure 11B:
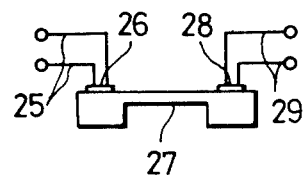

FIGS. 11(a) and 11(b) are views for explaining an embodiment in which piezoelectric thin films and a diaphragm are used for the centrifugal force detector 12. When an A.C. signal of approximately 100 Hz is applied across input terminals 25, the piezoelectric thin film 26 is vibrated. The vibration is transmitted to the piezoelectric thin film 28 at the other end through the diaphragm 27 as a surface elastic wave. It becomes an A.C. signal again, and is delivered from across output terminals 29. When a pressure acting on the central part of the diaphragm 27 changes, the frequency of the output signal changes in proportion to the pressure. By exploiting such characteristic, the weight 2 is mounted on the central part of the diaphragm 27 in advance in the state in which the former presses the latter under a certain pressure. Thus, the pressure acting on the diaphragm 27 is changed by a centrifugal force developing at the turn of a moving object, and the direction of the turn can be detected.

As set forth above, the present invention can precisely detect the traveling direction of a moving object by detecting the movement of a weight and can therefore provide a direction detection apparatus which is not affected by magnetism (an intense magnetic field, the magnetic deviation, etc.) at all, which is adjusted very easily and which is simple in structure, small in size and low in cost. The invention brings forth such excellent effects.

When a display device such as odometer and X-Y plotter is added to the direction detection apparatus of the present invention, not only the direction of the moving object but also the traveling locus thereof can be displayed. In such manner, the apparatus has very wide application.

What is claimed is:

1. A direction detection apparatus comprising a centrifugal force detector including a weight and a detecting means for detecting a movement of said weight and generating a centrifugal force signal, a clock signal generator generating a time signal, a velocity detector generating a velocity signal, and a computation means connected to said force detector, clock signal generator and velocity generator to compute a directional angle on the basis of said centrifugal force signal, said time signal and said velocity signal.

2. A direction detection apparatus according to claim 1, wherein said detecting means of said centrifugal force detector is constructed of thread resistors which are expanded and contracted by the movement of said weight.

3. A direction detection apparatus according to claim 1, wherein said detecting means of said centrifugal force detector is constructed of pressure-sensitive resistance elements whose resistances are changed by the movement of said weight.

4. A direction detection apparatus according to claim 1, wherein said detecting means of said centrifugal force detector is constructed of a piezoelectric transducer in the form of a cantilever and said weight is mounted on said cantilever.

5. A direction detection apparatus according to claim 1, wherein said detecting means of said centrifugal force detector is constructed of an electrostriction transducer on which said weight is mounted.

6. A direction detection apparatus according to claim 1, wherein said detecting means of said centrifugal force detector is constructed of a diaphragm which allows a surface elastic wave to pass therethrough and on which said weight is mounted.

* * * * *